United States Patent [19]

Caldwell

[11] 4,065,266

[45] * Dec. 27, 1977

[54] APPARATUS FOR MANUFACTURING PHOSPHORIC ACID

[75] Inventor: Harold B. Caldwell, Sarasota, Fla.

[73] Assignee: Whiting Corporation, Harvey, Ill.

[*] Notice: The portion of the term of this patent subsequent to Dec. 17, 1985, has been disclaimed.

[21] Appl. No.: 658,753

[22] Filed: Feb. 17, 1976

Related U.S. Application Data

[60] Continuation of Ser. No. 250,601, May 5, 1972, Pat. No. 3,939,248, which is a continuation of Ser. No. 779,823, Nov. 29, 1968, abandoned, which is a division of Ser. No. 632,101, April 19, 1967, Pat. No. 3,416,889, which is a continuation-in-part of Ser. No. 377,012, June 22, 1964, abandoned.

[51] Int. Cl.$^2$ .................. B01J 8/00; C01F 11/46; C01B 25/22
[52] U.S. Cl. .................. 23/259.2; 23/259.3; 23/285; 423/320
[58] Field of Search .......... 23/259.2, 259.3, 285, 23/273 R; 423/320

[56] References Cited

U.S. PATENT DOCUMENTS

| | | | |
|---|---|---|---|
| 1,945,281 | 1/1934 | Leithauser | 23/273 R |
| 2,728,635 | 12/1955 | Miller | 423/320 X |
| 2,827,366 | 3/1958 | Saeman | 23/273 R |
| 3,104,946 | 9/1963 | Veal | 23/259.2 X |
| 3,197,280 | 7/1965 | Boyle et al. | 423/320 |
| 3,257,168 | 6/1966 | Chelminski | 423/320 |
| 3,416,889 | 12/1968 | Caldwell | 23/259.2 X |
| 3,917,457 | 11/1975 | Bergstrom | 23/259.2 |
| 3,939,248 | 2/1976 | Caldwell | 23/259.2 X |

Primary Examiner—Barry S. Richman
Assistant Examiner—Michael S. Marcus
Attorney, Agent, or Firm—Lockwood, Dewey, Zickert & Alex

[57] ABSTRACT

Apparatus for manufacture of wet process phosphoric acid wherein phosphate rock and sulfuric acid are separately added to a combination reactor and cooler unit at a rate of addition such that the increase in calcium content and sulfate content in the slurry contained in the unit are small. Circulation of the slurry is provided and the rate at which sulfuric acid and phosphate rock are added is small compared to the rate of circulation of the reactor slurry.

6 Claims, 3 Drawing Figures

APPARATUS FOR MANUFACTURING PHOSPHORIC ACID

BACKGROUND AND DESCRIPTION OF THE INVENTION

This is a continuation of application Ser. No. 250,601, filed May 5, 1972, Pat. No. 3,959,248, issued Feb. 17, 1976, which is a continuation of Ser. No. 779,823, Nov. 29, 1968 abandoned, which is a continuing application (specifically a divisional) of my copending application entitled "Process and Apparatus for Making Phosphoric Acid", Ser. No. 632,101, filed Apr. 19, 1967 and now U.S. Pat. No. 3,416,889 issued Dec. 17, 1968 which in turn was a continuation-in-part of my then copending application Ser. No. 377,012, filed June 22, 1964 and now abandoned.

This invention relates generally to both process and apparatus improvements and innovations in the manufacture of phosphoric acid by the wet process. More specifically, the invention pertains to a combination reactor and slurry cooler unit utilizing vacuum wherein the basic reactions in the manufacture of phosphoric acid by the wet process may be carried out isothermally, with or without the use of a pre-mix tank.

The so-called wet process for the manufacture of phosphoric acid is well known and has been fully described in both the technical and patent literature. For example, a comprehensive description is given in Chapter 12, entitled "The Manufacture of Phosphoric Acid By The Wet Process," authored by William C. Weber, starting on page 174 of the textbook entitled "Phosphoric Acid, Phosphates and Phosphatic Fertilizers," Reinhold Publishing Corporation, 1952. The bibliography at the end of this chapter includes references to a number of patents and literature on the subject. The wet process is usually defined as the reaction of tricalcium phosphate with excess phosphoric acid to produce mono calcium phosphate which in turn reacts with sulfuric acid to give $H_3PO_4$ solution and gypsum crystals.

In a conventional plant for manufacture of phosphoric acid by the wet process there are several pre-mix tanks and usually from three to five reactor tanks, all equipped with agitators and arranged in a cascade system with the first premix tank being at the upper level and the last reactor tank being at the lowest level. A typical flow sheet is given on page 181 of the above mentioned text.

The object of this invention, generally stated, is the provision of improved process and apparatus for carrying out the manufacture of phosphoric acid by the wet process.

A primary object of the invention is to produce large and uniform gypsum crystals while carrying out the "wet" process for the production of phosphoric acid whereby product losses are inherently minimized during filtration and washing of the gypsum cake resulting in lower operating costs. Advantage is taken of the highly important principle of crystal growth which is the control and maintenance of the proper supersaturation value (i.e. temperature and concentration conditions) uniformly throughout the entire reaction zone (i.e. throughout the slurry body in the combination reactor and cooler unit). This value lies within the metastable zone for the particular environment and it has been established that such a value will deposit solute upon existing crystals rather than form new nuclei.

An important object of the invention is the provision of a combination reactor and slurry cooler unit utilizing vacuum wherein the power used for agitation is also used for circulation of the reaction slurry within a single vessel whereby the power requirements are reduced by as much as two-thirds of the power demand in a conventional wet-process installation.

An important object of the invention is the provision of a combination reactor and slurry cooler-evaporator unit for carrying out the manufacture of phosphoric acid by the wet process which makes use of a draft tube equipped with a propellor which provides a positive direction and path for high internal circulation and create and maintain a large controlled flow, whereby rapid and uniform dispersion of the reactants is achieved with close control of supersaturation.

A further object of the invention is the provision of a combination reactor and slurry cooler unit for carrying out the manufacture of phosphoric acid by the wet process which permits the elimination of recirculation pumps and piping to conduct the reaction slurry to a separate vacuum cooler.

A further object of the invention is a single-vessel reactor and slurry cooler of the type described wherein the reactants (i.e. phosphate rock, "return" acid [i.e. weak phosphoric acid], and sulphuric acid) are introduced into the vessel in such a way as to eliminate the usual pre-mix tanks.

A further object of the invention is to carry out the reactions in the manufacture of phosphoric acid by the wet process substantially isothermally so that temperature variations in the system rarely exceed more than 1° F. from the average bulk temperature, and with the reaction slurry undergoing a very high rate of recirculation in a predetermined flow pattern which creates a favorable environment for dispersion, reaction and crystal growth, the net result being that there is appreciably less nucleation in the reactor and therefore larger and more suitable gypsum crystal formation and growth is obtained giving a slurry with better filtration and working characteristics and resulting in increased filter capacity and lower phosphoric acid losses with the waste gypsum crystals.

A further object of the invention is the provision of an improved apparatus and process for carrying out the manufacture of phosphoric acid by the wet process which is simplier to operate and control than conventional installations, and wherein the obnoxious fluorine gases produced in the reactions of the wet process are condensed by, and removed with, the condenser water so as to make unnecessary the usual fluorine scrubber system with its ductwork, dampers and fans required to prevent atmospheric pollution.

Still a further object of the invention is the provision of a combination reactor and slurry cooler unit for carrying out the manufacture of phosphoric acid by the wet process which occupies less space and requires fewer moving parts and is substantially less expensive to build, operate, clean and maintain that conventional installations thereby substantially lowering the capital and operating costs.

Certain other objects of the invention will, in part, be obvious and will, in part, appear hereinafter.

For a more complete understanding of the nature and scope of the invention, reference may now be had to the following detailed description thereof taken in connection with the accompanying drawings wherein.

Figure 1:
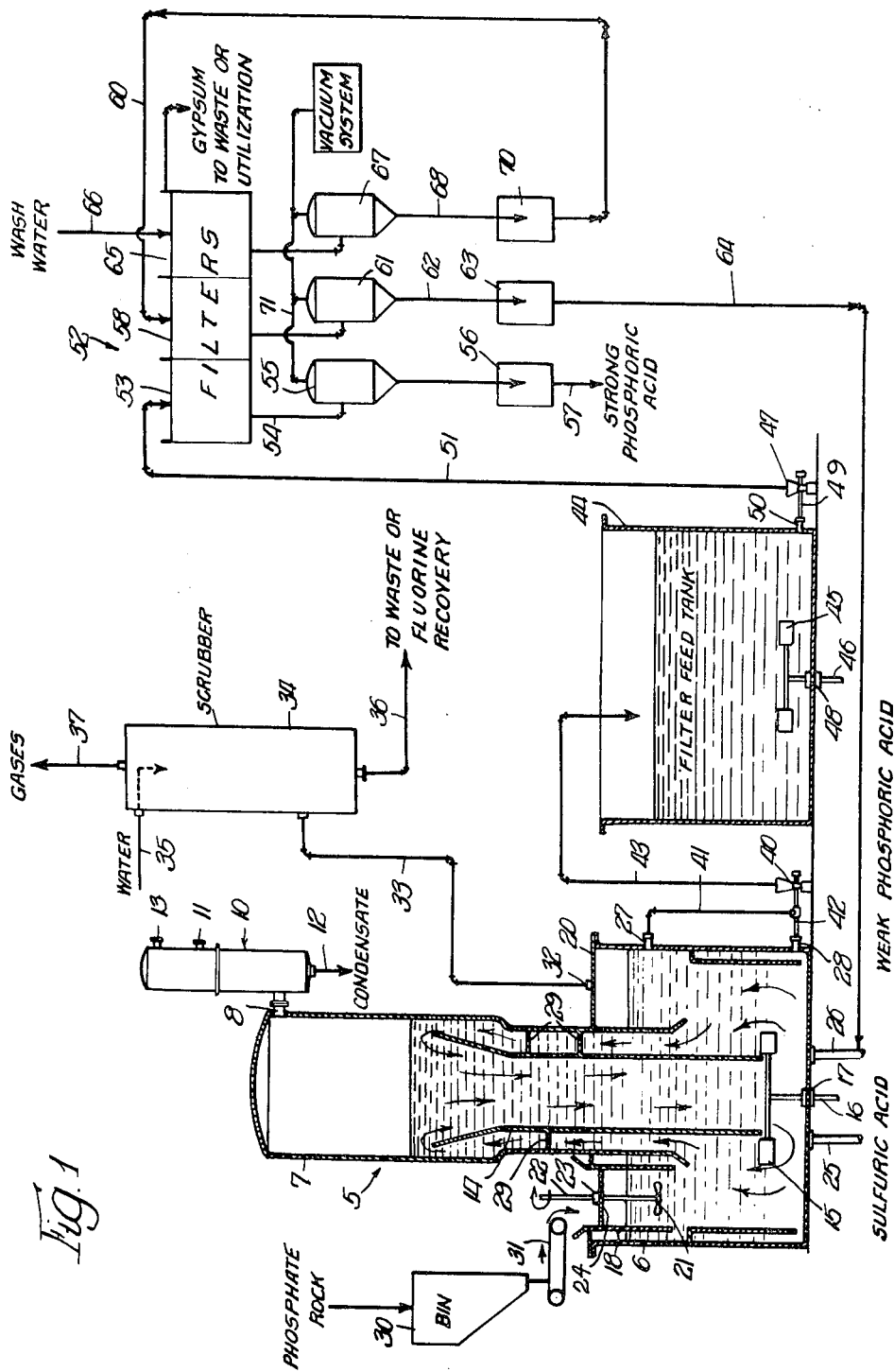
FIG. 1 is a diagrammatic view of a plant for producing phosphoric acid by the wet process utilizing the principles of the present invention and wherein a combination reactor and cooler unit constituting one embodiment of the invention is shown.

Referring to FIG. 1, a combination reactor and cooler unit is indicated generally at 5 and comprises a tank 6 having projecting above the center thereof a column 7 the upper end of which is closed while the bottom end dips below the normal liquid level within the tank 6 as indicated. The column 7 is provided adjacent the top with a connection 8 which leads to a source of vacuum such as a direct contact condenser 10 having a connection 11 in the side for entry of a cooling liquid such as cold water, a discharge connection 12 in the bottom, and a connection 13 adjacent the top for removal of non-condensables.

A draft tube 14 is co-axially supported within the column 7 with the upper end of the draft tube terminating at or somewhat below the normal operating liquid level within the column 7. The bottom end of the draft tube 14 projects downwardly beyond the lower end of the column 7 to adjacent the bottom of the tank 6 but does not extend all the way to the bottom. An agitator 15 mounted on a shaft 16 is disposed just below the bottom end of the draft tube 14. The shaft 16 projects through the bottom of the tank 6 through a combination bearing and seal of known type which is indicated at 17. The impeller in operation serves to establish and maintain a generally toroidal flow pattern which is indicated by the arrows. The liquid flows downwardly through the draft tube 14 and then spreads outwardly over the central bottom area of the tank and then upwardly into the annular space between the draft tube 14 and the interior of the column 7.

Phosphate rock is introduced into the tank 6 through a well in the top provided by a sleeve 18 the open bottom end of which dips below the normal operating level of liquid within the tank 6. The upper end of the sleeve 18 projects above the tank cover 20. The well or sleeve 18 is provided with an agitator comprising an impeller 21 mounted on the lower end of a shaft 22 which is journalled in a bearing 23 mounted on a plurality of spokes 24. The impeller shafts 16 and 22 are suitable supported and driven in known manner.

The tank 6 is provided at the bottom with an inlet connection 25 for sulphuric acid and another inlet connection 26 for weak phosphoric acid. Adjacent the top, the tank 6 is provided with a side outlet connection 27 on the side opposite the well or sleeve 18 and at a height just below where it is desired to establish the operating liquid level within the tank 6. An auxiliary outlet connection is provided at 28 adjacent the bottom of the tank.

Phosphate rock is stored in a bin 30 from which it may be gravity fed in known manner onto a horizontal belt conveyor 31 for discharge into the sleeve 18.

The cover structure 20 may be used as the support for the column 7 and the sleeve 18 while the draft tube 14 is supported within the column 7 by a plurality of spokes 29. Other means of support will be apparent to those skilled in the art.

Gases may be emitted from the freeboard space in the top of the tank 6 through a vent 32 which is connected by a line 33 to the inlet of scrubber 34 which is provided at the top with a shower of cold water through the line 35. The fluorine and other soluble gases go into solution and are removed from the bottom of the scrubber 30 through a line 36 and may be discharged to waste or to fluorine recover. The harmless non-condensable gases are vented through the top of the scrubber through a line 37.

A pump 40 serves to withdraw reaction slurry from the tank 6 at the outlet connection 27 through a pipe 41 which comes down and connects with a pipe 42 one end of which is connected with the suction inlet of the pump 40 and the opposite end of which is connected with the connection 28. The discharge connection of the pump 40 is connected with a line 43 which discharges the reaction slurry into a filter feed tank 44. The filter feed tank 44 is provided with an agitator 45 mounted on the upper end of a shaft 46 which passes through a seal 48 and is driven in known manner. The agitator 45 serves to keep the contents of the filter feed tank uniformly dispersed.

Reaction slurry is removed at a uniform rate from the filter feed tank 44 by means of a pump 47 the inlet connection of which is connected by means of a line 49 to an outlet connection 50 adjacent the bottom of the side wall of the tank 44. The pump 47 discharges the reaction slurry through a line 51 into the first stage of a series of filters - three being shown and indicated, generally, at 52. In the first filter 53 strong phosphoric acid is drawn off through the bottom by way of line 54 into a chamber 55 maintained under vacuum. The strong phosphoric acid collects in a tank 56 from which it can be removed as desired through the line 56. The reaction slurry, from which a substantial portion of the strong phosphoric acid has been removed, passes from the filter unit 53 into the second filter unit 58 which also receives wash water from the last filter through a line 60. Weak phosphoric acid is drawn off from the filter 58 into a suction or vacuum vessel 61 and flows through line 62 into a receiver 63 from which it is returned as "return" acid by way of line 64 to the inlet connection 26 in the tank 6.

The gypsum slurry passes from the filter unit 58 into the last filter unit 65 into which wash water is added through the line 66. The washed gypsum crystals are discharged from the last filter 65 either to waste or to any utilization they may have. The wash water is drawn into the vacuum receiver 67 and passes from the bottom by way of line 68 into the receiver 70 from which it is withdrawn and returned by way of line 60 to the intermediate filter 58. All of the vacuum receivers 55, 61, 67 are connected to a common vacuum header 71.

In operation, phosphate rock is continuously fed into the reactor through the well 18, sulphuric acid is introduced through the inlet connection 25 and weak phosphoric acid is introduced into the connection 26. As is apparent from FIG. 1, the addition of phosphate rock and sulfuric acid are separated in time with respect to the flow of slurry in the combination reactor and cooler unit 5 so that each of these reactants is fully dispersed in the slurry before the other reactant is added. The amount of sulphuric acid added is such as to normally maintain approximately 2% free sulphuric acid in the reaction slurry as withdrawn through the outlet connection 27. A vacuum is created in the head space at the upper end of the column 7 by means of the condenser 10 and the impeller 15 is operated so as to maintain the path of circulation indicated by the arrows and described above. When the combination reactor and cooler unit is properly operated the cooling effect created by the condenser 10 as it draws a vacuum in the upper end of column 7 and produces a vaporization from the surface of the liquid is sufficient to offset the heat generated by the exothermic reactions occurring within the reactor-cooler unit. The circulation established by the impeller 15 is sufficient so that the contents within the units are maintained at substantially uniform temperature throughout and the difference in temperature which occurs at the vaporizing surface in the column 7 is preferably not more than 1° F. Practically no "hot spots" or localized high temperature zones occur within the reactor-cooler unit 5. Material deviation from this preferred temperature range will result in increased nucleation.

The following working example will serve to further illustrate the nature of the invention and the manner in which the reactor-cooler unit is operated.

EXAMPLE 1

The reaction tank 6 and the filter feed tank 44 were each 18 feet in diameter, 20 feet high and the liquid level in the tank 6 was maintained at a height of 15 feet. The column 7 projected 30 feet above the top cover 20 and had a diameter of 10 feet at the upper end and a reduced diameter of 9 feet in the lower portion. The draft tube 14 was 65½ feet in diameter and projected down to within 24 inches of the bottom of the tank 6. The normal liquid level within the column 7 in operation was 36 feet above the bottom of the tank 6. The condenser 10 produced 22–24 inches of vacuum within the head space of the column 7.

Crushed phosphate rock was introduced by the conveyor 21 at the rate of 14 tons per hour. Sulphuric acid 98% was introduced into tank 6 at the rate of 26 gallons per minute while the weak phosphoric acid having a strength of 18–20% was returned through the connection 26 at the rate of 97 gallons per minute. The temperature of the liquid contents within the reactor cooler unit 5 were maintained in the range of 160°–170° F. and the change in temperature of the liquid at the interface of the column 7 was less than 1° F.

Reaction slurry containing crystals of gypsm dispersed in strong phosphoric acid was withdrawn through the outlet connection 27 at the rate of 125 gallons per minute. The pump 47 withdrew the reaction liquid or slurry from the filter feed tank 44 at an equal rate of 125 gallons per minute and discharged the same to the filter 52. Wash water at the rate of 78 gallons per minute was introduced through the line 66 and 40 gallons per minute of phosphoric acid having a concentration of 43–44% (equivalent $P_2O_5$ level approximately 31% by weight) were produced along with 41,000 pounds of gypsum crystals (dry basis) per hour.

As previously noted, the present invention has, as an important object, the production of large and uniform gypsum or calcium sulfate crystals by maintaining temperature and concentration conditions throughout the entire reaction zone which provide a proper supersaturation value within the metastable zone. This value has been identified above by reference to the operational parameter of maintaining substantially isothermal conditions throughout the body of slurry in the combination reactor and cooler unit. It will, however, be apparent to those skilled in this art that this "proper supersaturation value" can likewise be identified by other operational parameters without departing from the scope of the present invention. In other words, maintaining the substantially isothermal conditions in the combination reactor and cooler unit will inherently require a corresponding slurry circulation rate which likewise can be used as a means for identifying this desired operational condition at which large and uniform calcium sulfate crystals are produced.

It will be apparent from Example 1 that the rate of addition of phosphate rock and sulfuric acid into the combination reactor and cooler unit 5 are such that the increases in calcium content and sulfate content respectively of the liquid phase therein are small. For purposes of illustration, the precise increases in calcium content, expressed as CaO, and in sulfate content, expressed as $H_2SO_4$, inherently resulting from the operating conditions specified in Example 1 are a 0.142% increase of CaO and a 0.25% increase of $H_2SO_4$ when calculated as complete dispersion but without precipitation.

In particular, the inherent CaO increase in the Example 1 illustration is readily ascertained by first determining the daily output of 98 tons per day of $P_2O_5$ from the 40 gallons per minute of phosphoric acid produced which was specified in the example. Since it is well known in the phosphoric acid industry that the average heat release for wet process phosphoric acid is about 75,000 BTU per hour per ton per day of $P_2O_5$ produced, the total heat produced in the Example 1 illustration can be calculted to be 7,350,000 BTU per hour. The circulation rate within the combination reactor and cooler unit can then be calculated since, as pointed out in the example, temperature differences of not more than 1° F. were maintained. The circulation rate necessary to achieve this temperature difference within the slurry of not more than 1° F. is 19,000 gallons per minute or 254,000 pounds of slurry per minute. The CaO concentration in the liquid portion of slurry before the rock addition can then be calculated by noting that wet process phosphoric acid liquor under the given operating conditions contains approximately 0.15% CaO and that the slurry in the unit will contain approximately 40% solids. The CaO concentration in the liquor of the Example 1 illustration is thus determined to be 228 pounds per minute before rock addition. As was specified in the example, the rate of rock addition was 14 ton per hour, which, since phosphate rock normally contains approximately 46.2% CaO, accounts for an addition of 216 pounds per minute of CaO to the system. Accordingly, the total CaO in the liquor immediately following the rock addition is 444 pounds per minute and the percent CaO in the liquor following rock addition is determined to be 0.292% which is 0.142% greater than the CaO content before rock addition. Where uniform temperature conditions in the slurry are maintained within 2° F., the inherent CaO increase in the slurry for the same reactant feed rates would be 0.28%.

The inherent increase in sulfate content for the unit and conditions specified in Example 1 can likewise be calculated by noting that the 26 gallons per minute of 98% sulfuric acid added to the unit results in 392 pounds of $H_2SO_4$ per minute being introduced in the liquor contained in the unit. As was noted on page 9, the amount of sulfuric acid present in the reaction slurry withdrawn through outlet 27 will be approximately 2% $H_2SO_4$. Accordingly, the total $H_2SO_4$ in the liquor, prior to the addition of the 98% sulfuric acid feed, will be approximtely 3,040 pounds per minute of $H_2SO_4$. Accordingly, the total $H_2SO_4$ content of the liquor after addition of the sulfuric acid feed is 3,432 pounds per minute with the percent of $H_2SO_4$ in the liquor then being 2.25% and the percent $H_2SO_4$ increase being 0.251 %. Where uniform temperature conditions in the slurry are maintained within 2° F., the inherent $H_2SO_4$ increase for the same reaction feed rates will be 0.5%.

It will likewise be apparent from the above calculations that the rate at which the reactants were added was small when compared to the rate of circulation of the slurry. In particular, it was noted above that the 1° F. temperature differential in the slurry corresponded to a slurry circulation rate within the reactor and cooler unit of 19,000 gallons per minute or 254,000 pounds per minute. On the other hand, the sulfuric acid feed rate was only 26 gallons per minute and the feed rate of returned weak phosphoric acid was only 97 gallons per minute. Likewise, the feed rate of rock was only 467 pounds per minute.

It will be understood that the reaction conditions in the combination reactor-cooler unit 5 may be varied within appropriate ranges. For example, the temperature of the reaction slurry may range between 140° to 225° F., the vacuum maintained in the top of the evaporator column 7 may range from 26.5 to 10 inches and the velocity of the reaction slurry in the toroidal flow path range from 4 to 6 feet per second.

Figure 2:
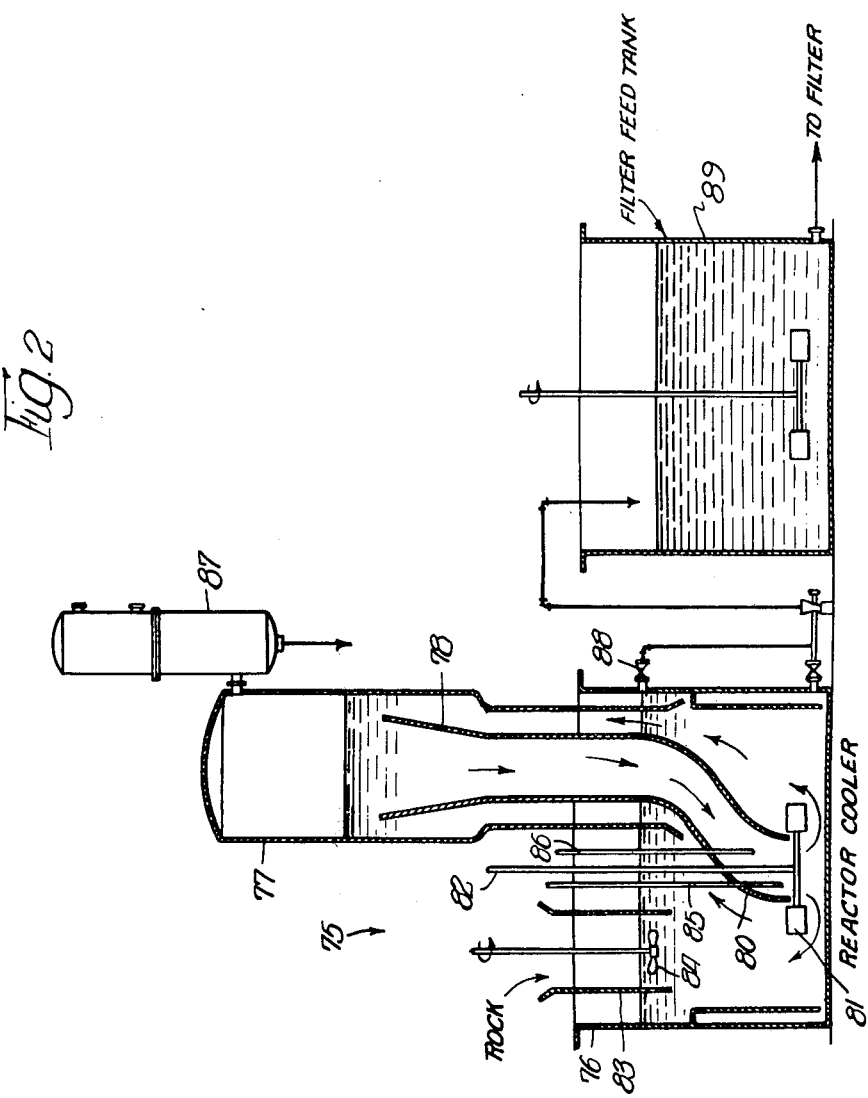
FIG. 2 is a diagrammatic view of a modified form of combined reactor and cooler unit constituting a second apparatus embodiment of the invention.

In FIG. 2 a modified form of reactor-cooler unit is shown and indicated generally at 75. It comprises a tank 76 and a column 77 the latter being disposed over the tank adjacent one side thereof. Mounted within the column 77 is a draft tube 78 the lower projecting end 80 of which is curved as shown so that the bottom end thereof is approximately concentric with the tank 76. In this embodiment an impeller 81 is supported on the bottom end of a drive shaft 82 which comes down from the top through the tank. The flow pattern is generally the same as in reactor-cooler unit 5 in FIG. 1 in that the impeller draws the liquid down through the draft tube 78 and it flows upwardly through the annular space between the tube and the column as indicated by the arrows. Phosphate rock is introduced through the sleeve 83 which is provided with the agitator 84. Sulphuric acid is introduced through line 85 which projects down through the side of the draft tube as shown to a place adjacent the discharge end. Return phosphoric acid is introduced through the line 86 which also passes through the lower end of the draft tube but terminates at a place to one side and slightly above the bottom end of the sulphuric acid inlet line 85.

The unit is provided with a condenser 87 for drawing a vacuum in the head space of the column 77.

In general, the reactor-cooler unit 75 operates in the same manner as does the reactor-cooler unit 5. That is, the phosphte rock, sulphuric acid and weak phosphoric acid are continuously introduced at the desired rates. The condenser 87 produce sufficient cooling effects so that the reactions occur within the body of liquid within the reactor-cooler unit substantially isothermally. Reaction slurry is continuously withdrawn through the outlet connection 88 and discharged into a filter feed tank 89. The reaction slurry may be filtered as described in connection with FIG. 1 for example.

Figure 3:
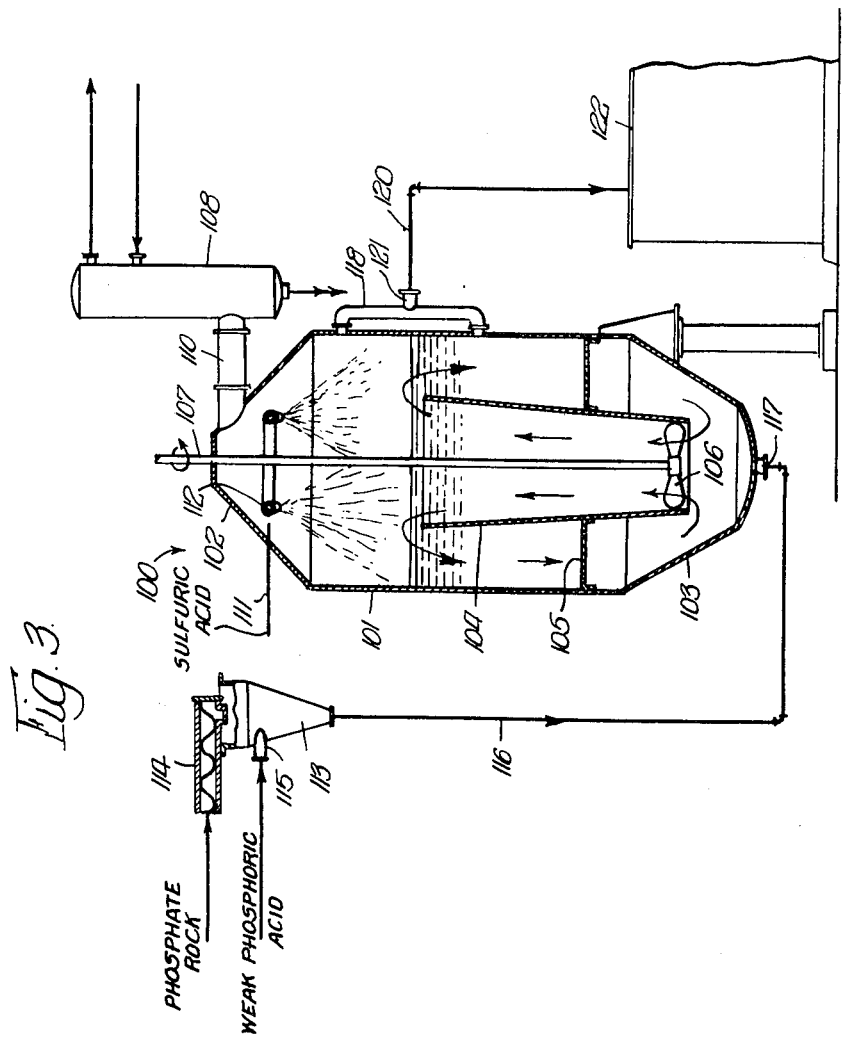
FIG. 3 is a diagrammatic view of a third apparatus and preferred embodiment of the invention with certain features not present in the apparatus shown in FIGS. 1 and 2.

In FIG. 3 another modified form of reactor-cooler unit is shown and indicated generally at 100. The main difference between the reactor-cooler units 5 and 100 resides in the fact that in unit 100 there is a single outside vessel or shell 101 having frusto-conical top and bottom end portions 102 and 103, respectively. In units 5 and 75 (FIGS. 1 and 2) there are separate reactor tanks 6 and 76, respectively, with columns 7 and 77, respectively, projecting thereabove.

A tapered draft tube 104 is co-axially supported on the interior of the vessel 101 by means of a plurality of radial spoke members 105-105, and impeller 106 is located in the lower and narrower end of the draft tube 104 being carried on the bottom end of a drive shaft 107 which projects through the top of the upper section 102. The blades of the impeller 106 are disposed so that it serves to draw liquid in from the bottom and move the liquid upwardly through the draft tube 104. The operating level within the vessel 101 is slightly above the upper end of the draft tube 104 whereby the impeller 106 serves to create and maintain a toroidal flow pattern in which the liquid flows upwardly through the draft tube 104 and downwardly on the outside thereof, as indicated by the arrows.

A condenser 108 is provided having its intake connected with the upper end of top portion 102 by means of the side connection 110.

Concentrated sulphuric acid is delivered into the unit 100 through a conduit 111 which projects into the upper section 102 and carries an annular spray head 112, the discharge openings of which are in the bottom so that the incoming acid is efficiently sprayed and distributed throughout the interior of the freeboard space in the vessel 101.

Phosphate rock and return acid are continuously fed into an outside mixing hopper 113. The rock is introduced by means of a screw conveyor 114 while the acid is introduced below the top of the hopper 113 through a side connection 115. This arrangement serves as a means for efficiently mixing the rock with the return acid to form a slurry which is withdrawn from the bottom of the hopper 113 through the line 116 and introduced through a connection 117 in the bottom section 103 of the unit 100.

Reaction slurry is continuously discharged from the vessel 101 through a vertical side tube 118, the bottom end of which communicates with the vessel 101 below the normal operating liquid level and the upper end of which connects to it above the normal operating level. A conduit 120 leads from a connection 121 at approximately the operating level and the reaction slurry continuously discharges into a filter feed tank 122.

The reactor-cooler unit 100 operates in the same general fashion as the units 5 and 75. That is, the reactants are continuously delivered to and fed into the vessel 101 while reaction slurry continuously discharges through the outlet line 120 so as to maintain the established operating level. The fresh concentrated sulphuric acid is effeciently and uniformly distributed over the surface of the reaction slurry. This surface will normally be turbulent due to vapor flash with the result that its actual surface may be several times the cross sectional area of the vessel 101. A foam phase will tend to exist above the slurry and the sulphuric acid spray may partially destroy the foam. If desired, water for dilution may be added to the concentrated sulfuric acid prior to its being sprayed in the upper end of the reaction vessel and this is readily permitted by the arrangement shown.

The slurry of phosphate rock and return acid is introduced at the bottom of the reaction vessel where the turbulence is maximum so that the slurry is quickly and uniformly blended with the contents of the reactor vessel.

The conditions within the reactor-cooler unit 100 are optimum for permitting the reactions of the wet process to be carried out isothermally. Inactive zones or pockets are eliminated and localized areas of reaction are avoided. One result is that scale formation on the reactor walls is held to a minimum and extended periods of operations are permitted without necessitating shutdown for removal of scale.

EXAMPLE 2

This example will serve to illustrate the construction and operation of an isothermal reactor installation in accordance with FIG. 3. The reactor-cooler 100 may have a height of 35 feet with the cylindrical section 101 having a diameter of 16 feet. The operating conditions may be summarized as follows for an installation having a capacity of 100 tons per day (tpd) of $P_2O_5$:

Phosphate rock is introduced through the conveyor 114 into the hopper 113 at the rate of 325 tpd while 690 tpd of return acid are introduced at the rate of 97.5 gallons per minute (gpm). Resulting slurry is fed at the rate of 118 gpm through the line 116 into the bottom of the vessel 101.

284 tpd of 98% sulphuric acid are introduced into the line 111 at the rate of 25 gpm. The impeller 106 is driven at the rate of 100 revolutions per minute (rpm) by a 50-75 horsepower motor. Reaction slurry is withdrawn through line 120 at a 40% concentration at a rate of 125 gpm which is equal to 1200 tpd. The condenser 108 is operated so as to maintain a vacuum within the head space.

Under the foregoing conditions, the retention time within the reactor-cooler unit 100 is 4 hours. It will be understood that the reaction slurry is filtered and is otherwise processed in a suitable manner as described for example in connection with FIG. 1.

The foregoing example and embodiments of the invention are intended to be interpreted as illustrative and not in a limiting sense.

What is claimed as new is:

1. Apparatus for reacting phosphate rock and sulfuric acid in the wet process of making phosphoric acid which comprises: a reactor-cooler unit adapted to be operated with a freeboard space; a vacuum source in communication with said freeboard space; a pre-mixer in which phosphate rock is combined with a liquid to form a slurry prior to being introduced into said reactor-cooler unit, slurry conduit means connecting said pre-mixer with said reactor-cooler unit; and, means for introducing sulfuric acid into said reactor-cooler unit; said reactor-cooler unit comprising an enclosed vessel, flow directing means within said enclosed vessel, forced circulation means operatively associated with said flow directing means for circulating a body of reaction slurry contained in said reactor-cooler unit in a flow pattern adapted to expose substantially the entire body of said reaction slurry to a subatmospheric pressure maintained in said freeboard space at a rate sufficient to provide substantially uniform conditions of temperature and concentration throughout said body of reaction slurry, and outlet means in said vessel for withdrawing reaction slurry from said reactor-cooler unit.

2. Apparatus for reacting phosphate rock and sulfuric acid in the wet process of making phosphoric acid which comprises: a reactor-cooler unit adapted to be operated with a freeboard space; a vacuum source communicating with said freeboard space; a pre-mixer in which phosphate rock is mixed with a liquid to form a slurry prior to being introduced into said reactor-cooler unit; slurry conduit means communicating said pre-mixer with said reactor-cooler unit; and, means for introducing sulfuric acid into a body of reaction slurry contained in said reactor-cooler unit; said reactor-cooler unit including an enclosed vessel, a draft tube disposed within said vessel, forced circulation means in association with said draft tube for creating and maintaining a toroidal flow pattern within said body of reaction slurry contained within said reactor-cooler unit, whereby substantially said entire body of reaction slurry will be exposed to said freeboard space at at rate sufficient to provide substantially uniform conditions of temperature and concentration throughout said body of reaction slurry, and outlet means for withdrawing reaction slurry from said reactor-cooler unit.

3. Apparatus for reacting phosphate rock and sulfuric acid in the wet process of making phosphoric acid which comprises: an enclosed reactor-cooler vessel adapted to be operated with a freeboard space; a vacuum source in communication with said freeboard space; a pre-mixer in which phosphate rock is combined with a liquid to form a slurry prior to being introduced into said reactor-cooler vessel, means for communicating said pre-mixer with said reactor-cooler vessel; and, means for introducing sulfuric acid into said reactor-cooler vessel; means within said enclosed vessel for circulating a body of reaction slurry contained therein in a flow pattern adapted to expose substantially the entire body of said reaction slurry to a subatmospheric pressure maintained in said freeboard space at a rate sufficient to provide substantially uniform conditions of temperature and concentration throughout said body of reaction slurry, and outlet means in said vessel for withdrawing reaction slurry therefrom.

4. The apparatus of claim 3 wherein said liquid is weak phosphoric acid.

5. The apparatus of claim 3 wherein said means for circulating said body of reaction slurry in said enclosed vessel comprises a flow directing means and forced circulation device.

6. The apparatus of claim 5 wherein said flow directing means comprises a draft tube.

* * * * *

UNITED STATES PATENT AND TRADEMARK OFFICE
CERTIFICATE OF CORRECTION

PATENT NO. : 4,065,266
DATED : December 27, 1977
INVENTOR(S) : Harold B. Caldwell It is certified that error appears in the above-identified patent and that said Letters Patent are hereby corrected as shown below:

Column 5, line 31, "65 1/2" should read --6-1/2--

Column 5, line 47 "gypsm" should read --gypsum--

Column 6, line 47, "ton" should read --tons--

Column 7, line 5, "0.251" should read --0.25--

Column 7, line 58, "produce" should read --produces--

Signed and Sealed this

First Day of April 1980

[SEAL]

Attest:

SIDNEY A. DIAMOND

Attesting Officer        Commissioner of Patents and Trademarks